(12) United States Patent
Robertson et al.

(10) Patent No.: US 8,667,190 B2
(45) Date of Patent: Mar. 4, 2014

(54) SIGNAL PROCESSING SYSTEM, INTEGRATED CIRCUIT COMPRISING BUFFER CONTROL LOGIC AND METHOD THEREFOR

(75) Inventors: Alistair Robertson, Glasgow (GB); Joseph Circello, Phoenix, AZ (US); Mark Maiolani, East Kilbride (GB)

(73) Assignee: Freescale Semiconductor, Inc., Austin, TX (US)

( * ) Notice: Subject to any disclaimer, the term of this patent is extended or adjusted under 35 U.S.C. 154(b) by 105 days.

(21) Appl. No.: 13/384,835

(22) PCT Filed: Jul. 20, 2009

(86) PCT No.: PCT/IB2009/053139
§ 371 (c)(1),
(2), (4) Date: Jan. 19, 2012

(87) PCT Pub. No.: WO2011/010184
PCT Pub. Date: Jan. 27, 2011

(65) Prior Publication Data
US 2012/0131241 A1  May 24, 2012

(51) Int. Cl.
*G06F 13/00* (2006.01)
*G06F 3/00* (2006.01)

(52) U.S. Cl.
USPC ............. 710/56; 710/2; 710/5; 710/15; 710/8

(58) Field of Classification Search
None
See application file for complete search history.

(56) References Cited

U.S. PATENT DOCUMENTS

| | | | |
|---|---|---|---|
| 4,800,490 A | 1/1989 | Tanaka et al. | |
| 5,623,608 A | 4/1997 | Ng | |
| 5,692,168 A | 11/1997 | McMahan | |
| 6,813,767 B1 | 11/2004 | Wilke | |
| 7,486,558 B2 | 2/2009 | Li | |
| 7,487,297 B2 | 2/2009 | El-Essawy et al. | |
| 7,487,340 B2 | 2/2009 | Luick | |
| 2006/0174068 A1 | 8/2006 | Dreup et al. | |
| 2007/0233923 A1* | 10/2007 | Lee | 710/116 |

OTHER PUBLICATIONS

International Search Report and Written Opinion correlating to PCT/IB2009/053139 dated May 25, 2010.

* cited by examiner

*Primary Examiner* — Scott Sun

(57) ABSTRACT

A signal processing system comprising buffer control logic arranged to allocate a plurality of buffers for the storage of information fetched from at least one memory element. Upon receipt of fetched information to be buffered, the buffer control logic is arranged to categorize the information to be buffered according to at least one of: a first category associated with sequential flow and a second category associated with change of flow, and to prioritize respective buffers from the plurality of buffers storing information relating to the first category associated with sequential flow ahead of buffers storing information relating to the second category associated with change of flow when allocating a buffer for the storage of the fetched information to be buffered.

20 Claims, 3 Drawing Sheets

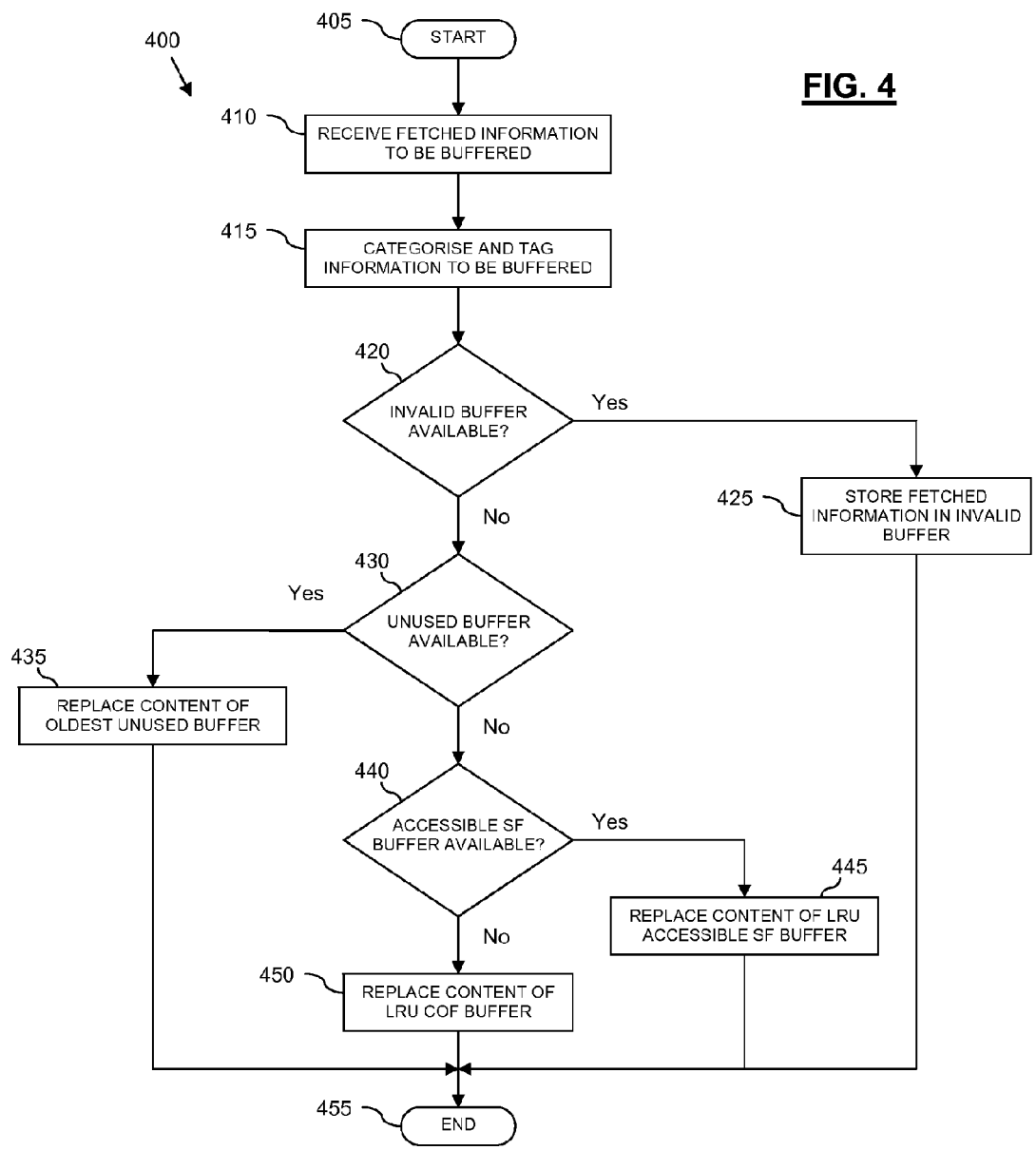

SIGNAL PROCESSING SYSTEM, INTEGRATED CIRCUIT COMPRISING BUFFER CONTROL LOGIC AND METHOD THEREFOR

FIELD OF THE INVENTION

The field of this invention relates to a signal processing system comprising buffer control logic and method therefor, and more particularly to a signal processing system comprising buffer control logic arranged to allocate buffers for the storage of information.

BACKGROUND OF THE INVENTION

In signal processing systems, fetching instructions and data from memory is often a slow process compared to the operating frequency of the master device that has initiated the fetch instructions. Consequently, if the system is running a large number of such fetch operations, it can cause a significant decrease in the overall system performance. As central processing unit (CPU) clock rates increase, and technologies such as multi core become more prevalent, system on chip (SoC) processing performance is being increasingly limited by memory bandwidth due to memory access speeds improving across technologies at a much slower rate than CPU clock speeds.

It is known to implement prefetching schemes, whereby data and/or instructions are fetched in advance of the master device initiating a fetch request for them. As a result the performance impact of accessing relatively slow memory elements may be reduced. Known prefetching schemes store fetched information within buffers, with the content of buffers being replaced by newly fetched information based on a replacement strategy such as, for example, on a least recently used (LRU) basis.

A problem with such known replacement strategies is that, whilst they are adequate for substantially linear program flow and tight loops within the program flow, they do not take into account long span changes of program flow. Accordingly, for application code comprising a relatively large proportion of long span changes of program flow, such known replacement strategies are not an effective means of buffering information.

SUMMARY OF THE INVENTION

The present invention provides a signal processing system, an integrated circuit comprising such a signal processing system, and a method therefor as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

FIG. 4 illustrates an example of a simplified flowchart of a method for buffering information.

DETAILED DESCRIPTION

The present invention will now be described with reference to an example of a signal processing system substantially integrated within a single semiconductor device, such as a system on chip (SoC) device. However, it will be appreciated that the examples herein described are not limited to use within such an integrated signal processing system, and may equally be applied to alternative signal processing arrangements and architectures. Furthermore, because the example apparatus implementing the present invention is, for the most part, composed of electronic components and circuits known to those skilled in the art, circuit details will not be explained in any greater extent than that considered necessary as illustrated below, for the understanding and appreciation of the underlying concepts of the invention and in order not to obfuscate or distract from the teachings of the invention.

Figure 1:
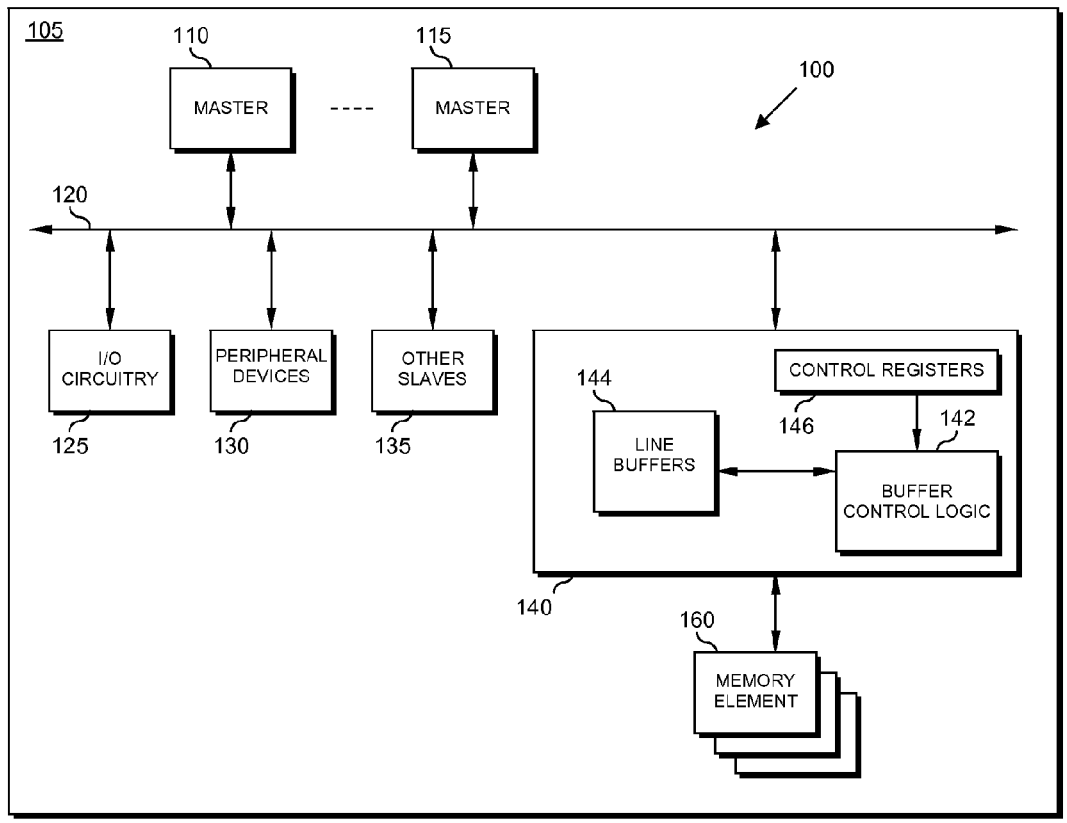
FIG. 1 illustrates an example of a signal processing system.

Referring now to FIG. 1, there is illustrated an example of a signal processing system 100. For the illustrated example, the signal processing system 100 is integrated within an integrated circuit (IC) 105. The signal processing system 100 of FIG. 1 comprises one or more master devices 110, 115 operably coupled to a system interconnect 120. Examples of master devices are central processing units (CPU) or direct memory access controllers (DMA). Other master devices could include communication processors such as Ethernet or FlexRay controllers, graphics processors and/or controllers, etc. In some examples, master devices that are external to the IC 105 may also be operably coupled to the system interconnect 120, for example via an external bus or interconnect pin (not shown) on the IC 105. System interconnect 120 may be implemented in any suitable manner, such as by way of a system bus operating according to a system bus protocol, such as the Peripheral Component Interface (PCI) protocol or ARM's Advanced Microcontroller Bus Architecture (AMBA™) protocol. Alternatively, system interconnect 120 may comprise switching circuitry, which routes information between different master and slave devices connected thereto.

One or more slave devices are also operably coupled to the system interconnect 120, which for the illustrated example comprises input/output (I/O) circuitry 125, peripheral devices 130 and other slave devices 135. These slave devices are illustrated in FIG. 1 as also being integrated within the IC 105. However, some or all of the slave devices may alternatively be located externally to the IC 105. The signal processing system 100 further comprises buffer control logic 142, which for the illustrated example forms part of memory access logic 140 operably coupled to system interconnect 120, the memory access logic 140 being arranged to provide access to one or more memory element(s) 160. For the illustrated example, the one or more memory element(s) 160 is/are shown as being integrated within the IC 105. However, in other examples one or more memory elements may be located external to the IC 105.

The buffer control logic 142 is arranged to allocate line buffers 144 for the storage of information, and in particular for the illustrated example for the storage of information fetched from the one or more memory element(s) 160. For example, the memory access logic 140 may be arranged, upon receipt of an access request from a master device 110, 115, to prefetch a block of memory located sequentially after the location of the requested content, and to store the content of the prefetched block of memory in buffers 144. In this manner, when a request for memory content located within the prefetched memory block is subsequently received from a master device 110, 115, the requested content is readily available within buffers 144, thereby avoiding the need for a relatively slow access to memory 160 to be performed at that time in order to retrieve the information, and thus avoiding the corresponding degraded system performance.

Figure 2:
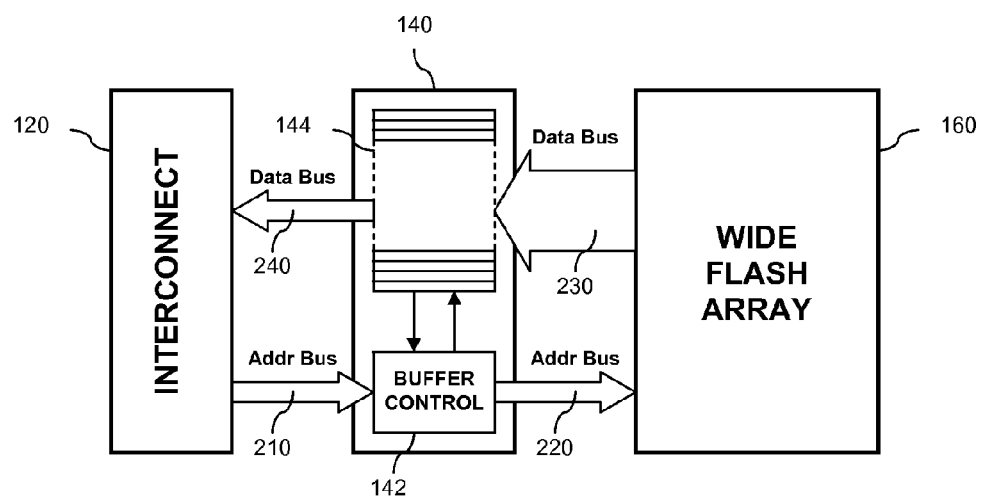
FIG. 2 illustrates a simplified block diagram showing an example of memory access functionality.

FIG. 2 illustrates a simplified block diagram showing an example of memory access functionality for the system 100 of FIG. 1. When an access request is received by the memory access logic 140 via interconnect 120 and address bus 210, it is passed to the buffer control logic 142. If the requested information has previously been prefetched and is stored within one of the buffers 144 of memory access logic 140, then the requested information may be retrieved from buffers 144 and returned to the requesting master device, via data bus 240, without the need for a relatively slow access to the memory element 160, which for the illustrated example comprises a wide flash array. However, if the requested information is not present within buffers 144, then the information must be fetched from the memory element 160 in which it is stored, for example by way of the buffer control logic 142 forwarding the received access request to the memory element 160 via address bus 220. The requested information may then be returned by the memory element 160 to the memory access logic 140 via data bus 230 and then to system interconnect 120 via data bus 240.

For the illustrated example, each memory access request relates to an address in memory, with each memory access request including a reference address and a size specifier defining the number of bits (or bytes) to be referenced, say a memory 'line' comprising 32 bits (4 bytes) of information. Such a 32 bit memory line may comprise instruction information and/or data information. Upon receipt of the access request, the memory element 160 is arranged to retrieve a line of memory content, which includes the address to which the access relates, and also subsequently retrieve one or more lines corresponding to sequential addresses. For example, the memory element 160 may retrieve eight lines of memory content, each comprising, say, 32 bits of information. Thus, the memory element 160 may retrieve a block of memory content comprising up to, in this example, 256 bits of information for a single memory access request, and to return the block of memory content to the memory access logic 140. In this manner, not only is the requested datum fetched from memory, but also the next sequential locations of information are prefetched from memory. In this manner, data and/or instructions may be fetched in advance of a master device 110, 115 initiating a fetch for them, and buffered within the buffers 144. As a result the performance impact of accessing relatively slow memory elements 160 may be reduced. The buffers 144 may be arranged such that each buffer is capable of storing a line of memory (N bits (or bytes) of information) returned by the memory element 160.

Prefetching of information from the memory element 160, may not be limited to being performed solely when the requested information is not present within buffers 144. For example, requested information may have previously been prefetched, and therefore is present within buffers 144, but may be located towards a sequentially downstream end of a block of prefetched sequential memory content. Accordingly, assuming a generally linear program flow, information being requested may extend beyond the prefetched block of memory content. Therefore, rather than waiting until the requested information extends beyond the prefetched block of memory content before prefetching further memory content, which would result in a delay in the program flow whilst such information is prefetched, the buffer control logic 142 may be arranged, upon receipt of a request for information that has previously been prefetched but where the information is located towards a sequentially downstream end of a block of prefetched memory, to cause further information located generally downstream of the program flow with respect to the requested information to be prefetched. In this manner, the buffer control logic 142 may be arranged to implement prefetching schemes, whereby data and/or instructions are fetched in advance of the master device initiating a fetch for them. As a result the performance impact of accessing relatively slow memory elements may be reduced.

Known prefetching schemes store fetched information within buffers, with the content of buffers being replaced by newly fetched information based on a replacement strategy such as, for example, on a least recently used (LRU) basis. A problem with such known replacement strategies is that, whilst they are adequate for substantially linear program flow and tight loops within the program flow, they do not take into account long span changes of program flow. Accordingly, for application code comprising a relatively large proportion of long span changes of program flow, such known replacement strategies are not an effective means of buffering information.

In accordance with some examples, upon receipt of information to be buffered, the buffer control logic 142 is arranged to categorise the information to be buffered according to one of at least a first category associated with sequential flow and a second category associated with a change of flow. The buffer control logic 142 is further arranged to prioritise buffers storing information relating to the first category associated with sequential flow ahead of buffers storing information relating to the second category associated with the change of flow when allocating a buffer 144 for the storage of fetched information to be buffered.

Figure 3:
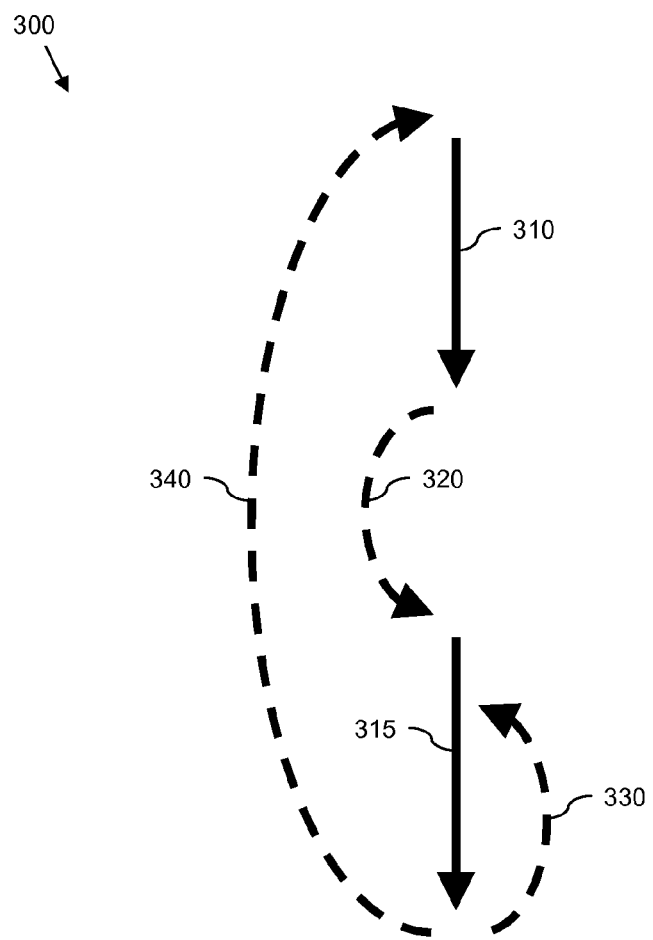
FIG. 3 illustrates examples of information flows.

For example, referring to FIG. 3 there are illustrated examples of typical information flows 300, such as program flows and/or data access flows. Sequential flows comprising linear information flows are illustrated generally at 310 and 315, whereby memory access requests received from, say, a master element 110, 115 of FIG. 1 relate to sequential addresses for information within memory, which are relatively easy to predict, and can be efficiently prefetched and stored within buffered memory. A change of flow comprising a forward branch is illustrated at 320. Such forward branches may comprise a short span, for example only a few address bytes in length, and as such would typically not jump beyond a current buffer. Accordingly, such short span forward branches can typically also be efficiently predicted and prefetched. However, a forward branch 320 may alternatively comprise a longer span whereby, for example, the accessed address jumps beyond the current buffer lengths. As a result, such a long span forward branch is likely to relate to information that may not be contained within the current buffers, and is therefore difficult to predict for prefetching. Flow changes are also illustrated in FIG. 3 comprising backwards branches 330, 340. Backwards branch 330 comprises a short span backwards branch, for example only a few bytes in length, and as such would typically not jump beyond the start of the current buffer. Accordingly, such short span backwards branches can typically also be efficiently handled with prefetched information stored within buffered memory. However, backwards branch 340 comprises a longer span whereby the accessed address jumps back beyond the start of the current buffer. As a result, such a long span backwards branch may well to relate to information not contained within the current buffers, and with known buffer replacement strategies is likely to often relate to information that has been replaced and therefore no longer stored within buffer memory.

Thus, according to some examples, the buffer control logic 142 of FIG. 1 may be arranged to categorise and tag each fetch from the one or more memory element(s) 160 as corresponding to, say, one of a sequential flow fetch or a change of flow fetch. In particular, for the examples of information flow 300 illustrated in FIG. 3, fetches for the linear, sequential information flows 310, 315 would be categorised and tagged as 'sequential flows'. Conversely the forward and backward branches 320, 330, 340 might be categorised and tagged as 'changes of flow'.

Accordingly, when the buffer control logic 142 subsequently receives further fetched information to be buffered, the buffer control logic 142 is able to prioritise buffers storing sequential flow information ahead of buffers storing information corresponding to a change of flow when selecting a buffer within which to replace currently stored information with the most recently fetched information. In this manner, information relating to a change of flow fetch is less likely to be replaced by subsequently fetched information. As a result, when a change of flow relating to previously prefetched information occurs, the previously prefetched change of flow information is more likely to still be contained within buffers 144. Thus, the buffer hit ratio for changes of flow may be improved along with the performance of system 100. Since linear information flows are generally more easily predictable, and therefore can be relatively efficiently prefetched, the more regular replacement of such buffered linear information flows is unlikely to significantly affect the buffer hit ratio for sequential information flows. As a result, by taking the type of information flow into consideration, the overall performance impact of accessing relatively slow memory element(s) 160 may be reduced, as compared with known buffer replacement strategies.

In accordance with some examples, the buffer control logic 142 of FIG. 1 may be arranged to prioritise buffers storing information relating to the first category associated with sequential flow ahead of buffers storing information relating to the second category associated with change of flow when allocating a buffer 144 for the storage of information to be buffered if neither of a vacant (invalid) buffer or a buffer storing unused information is available. For example, the buffer control logic 142 may be arranged to implement a buffer replacement strategy comprising the following priorities for storing fetched information to be buffered:

(i) Invalid buffers (for example buffers comprising an initial unloaded state, or for which hardware or software events have caused invalidation of the buffers);

(ii) Unused buffers (for example buffers that have been loaded with sequential or change of flow fetched information, but which have subsequently not been accessed);

(iii) LRU accessible sequential buffer (for example buffer storing least recently accessed (used) sequential information—excluding sequential buffers to be maintained); and (iv) LRU change of flow buffer.

Invalid buffers that have yet to have fetched information stored therein, and comprise an initial unloaded state, or for which hardware or software events have caused invalidation of the buffers, are used first for storing fetched information to be buffered. Accordingly, previously fetched and buffered information will only be replaced if no vacant (invalid) buffers are available. If there are no invalid buffers available, buffers containing previously fetched information that has not been accessed, and therefore may have been incorrectly fetched, are used to store newly fetched information. Since the previously fetched information being replaced may have been incorrectly fetched, and therefore of no benefit in terms of being buffered, its replacement is unlikely to affect the performance of the system 100. In some examples, such unused buffers may be maintained, that is their content may be protected from being replaced, for example for a period of time or number of clock cycles from when the unused content was loaded into the buffers in order to avoid accidentally replacing the information before a master device 110, 115 has had an opportunity to access the information.

If there are no invalid buffers or unused buffers available, the buffer control logic 142 in the above example is arranged to prioritise buffers 144 storing information relating to the first category associated with sequential flow ahead of buffers storing information relating to the second category associated with change of flow when allocating a buffer 144 for the storage of information to be buffered. In particular for the above example, where there are no invalid buffers or unused buffers available, the buffer control logic 142 is arranged to store fetched information within an accessible buffer containing sequential flow (SF) information. For example, the buffer control logic 142 may be arranged to maintain a minimum number (SF_min) of buffers containing the most recently buffered sequential flow information, whereby the content of such buffers to be maintained is protected from being replaced. Accordingly, such maintained buffers are not accessible for storing fetched information to be buffered. Therefore, a sequential flow buffer is accessible for storing fetched information if there are more than SF_min buffers containing sequential flow information. If no buffer containing sequential flow information is accessible (and no invalid buffers or unused buffers are available), the buffer control logic 142 stores fetched information within a buffer containing change of flow information. In this manner, a minimum number (SF_min) of buffers may be generally maintained for buffering sequential flow information to ensure efficient sequential flow prefetching and buffering, whilst the buffering of change of flow information may be prioritised for the remaining available buffers in order to improve the buffer hit ratio for change of flow information. Furthermore, for the above example, the buffer control logic 142 is arranged, upon determining an appropriate category of stored information to be replaced, for example either sequential flow information if such a buffer is available or change of flow information, to allocate a buffer 144 storing the least recently used (LRU) information of the appropriate category. In this manner, the buffer control logic 142 may take into account both change of flow information and how recently buffered information is used when determining which buffer to allocate for storing newly fetched information.

In accordance with a further example, the minimum number (SF_min) value for the most recently allocated sequential flow information buffers may be programmed at run time, for example in a form of a parameter loaded into control registers 146. In this manner, the minimum number (SF_min) value for the most recently allocated sequential flow information buffers may be configurable by software executed on a master device 110, 115 of the signal processing system 100, and thus may be adapted to take into account specific application profiles. Additionally or alternatively, the buffer control logic 142 may be arranged to track changes of flow, for example branch spans for change of flow fetches, and to adjust the minimum number (SF_min) value for the most recently allocated sequential flow information buffers in accordance with the tracked changes of flow. In this manner, the buffer control logic 142 may adapt its replacement strategy to better suit an application profile of application code being executed by the master device(s) 110, 115. For example, the buffer control logic 142 may be arranged to track, say, backward branches with a span greater than a threshold value, and to configure the minimum number (SF_min) value for the most recently allocated sequential flow information buffers to accommodate the frequency of such backward branches. For example, an appropriate number of address lines for such a threshold span length may comprise two to four lines. In this manner, a larger value for SF_min may be configured for application code comprising fewer large span changes of flow, whilst a small value for SF_min may be configured for application code comprising a greater number of large span changes of flow.

In some examples, the buffer control logic 142 may further be arranged such that branches with a span greater than a maximum available buffer capacity would be disregarded when configuring the minimum number (SF_min) value, in order to avoid the system running out of buffer capacity. For example, the buffer control logic 142 may be arranged to track branches comprising spans within a range of span length thresholds, with the thresholds being dependent upon, say, the number of buffers available for sequential flow storage. Accordingly, a proportion of, say, backward branches with a span greater than the capacity of the current minimum number (SF_min) value AND with a span less than the maximum total capacity of buffers available, may be used for updating the minimum number (SF_min) value.

As previously mentioned, short span changes of flow such as, say, branches 320, 330, comprising only a few address lines in length, would typically not jump beyond a current buffer, and as such can typically be efficiently handled with prefetched linear information stored within buffered memory. Accordingly, it is contemplated that, upon receipt of fetched information to be buffered relating to a change of flow, the buffer control logic 142 may be arranged to categorise information to be buffered according to a change of flow span for the information to be buffered. For example, the buffer control logic 142 may be arranged to determine a change of flow span for the information to be buffered, and if the determined change of flow span is less than a threshold value, for example the same or similar threshold as that described above for configuring the minimum number (SF_min) value for the most recently allocated sequential flow information buffers, to categorise the information as sequential flow information.

Alternatively, the buffer control logic 142 may be arranged to categorise information relating to a change of flow comprising a span less than the threshold value as a third category associated with short span changes of flow, and to prioritise buffers storing information relating to this third category of information between the first category associated with sequential flow and the second category associated with change of flow when allocating a buffer 144 for the storage of the fetched information to be buffered.

In an alternative example, an assumption may be made that substantially all linear flow information is fetched from the memory element 160 by prefetch operations, whilst substantially all change of flow information is fetched from the memory element 160 as a direct response to requests from a master device 110, 115. In this example, information may more simply be categorised on the basis of the trigger that lead to it being fetched from memory 160. More specifically, information that is fetched from memory by prefetch operations may be categorised as sequential flow (linear) information, whilst information fetched from memory as a direct response to request from a master device may be categorised as change of flow information.

Referring now to FIG. 4, there is illustrated an example of a simplified flowchart 400 of a method for buffering information. The method starts at step 405 and proceeds to step 410 with a receipt of fetched information to be buffered. Next, in step 415, the received information is categorised and tagged according to one of at least a first category associated with sequential flow and a second category associated with change of flow. The method then moves on to step 420, where it is determined whether an invalid/vacant buffer is available. If such an invalid buffer is available, the method moves on to step 425, where the fetched information is stored within the available invalid buffer. The method then ends at step 455. Referring back to step 420, if there is no invalid buffer available, the method moves on to step 430, where it is determined whether an unused buffer (e.g. a buffer that has been loaded with sequential or change of flow information, but which has subsequently not been accessed) is available. If such an unused buffer is available in step 430, the method moves on to step 435, where the fetched information is stored within the available unused buffer for example the oldest unused buffer. The method then ends at step 455. Referring back to step 430, if no unused buffer is available, the method moves on to step 440, where it is determined whether an accessible sequential flow buffer is available. For example, a minimum number (SF_min) of buffers containing the most recently buffered sequential flow information may be maintained, whereby the content of such buffers to be maintained is protected from being replaced. Accordingly, such maintained buffers are not accessible for storing fetched information to be buffered. Therefore, a sequential flow buffer is accessible for storing fetched information if there are more than SF_min buffers containing sequential flow information. If an accessible sequential flow buffer is available, the method moves on to step 445, where the fetched information is stored within the least recently used accessible and available sequential flow buffer. The method then ends at step 455. Referring back to step 440, if no accessible sequential flow buffer is available, the method moves on to step 450, where the fetched information is stored with the least recently used buffer containing change of flow (COF) information. The method then ends at step 455.

In the foregoing specification, the invention has been described with reference to specific examples of embodiments of the invention. It will, however, be evident that various modifications and changes may be made therein without departing from the broader scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 100 are circuitry located on a single integrated circuit or within a same device. Alternatively, system 100 may include any number of separate integrated circuits or separate devices interconnected with each other. For example, memory element(s) 160 may be located on a same integrated circuit as master devices 110 and 115 or on a separate integrated circuit or located within another peripheral or slave, discretely separate from other elements of system 100. Peripheral 130 and I/O circuitry 125 may also be located on separate integrated circuits. Also for example, system 100 or portions thereof may be soft or code representations of physical circuitry or of logical representations convertible into physical circuitry. As such, parts of system 100 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 100 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A signal processing system comprising:
buffer control logic arranged to allocate a plurality of buffers for the storage of information fetched from at least one memory element, wherein, upon receipt of fetched information to be buffered, the buffer control logic is arranged to: categorise the information to be buffered according to at least one of: a first category associated with sequential flow and a second category associated with change of flow; and the buffer control logic is arranged to prioritise respective buffers from the plurality of buffers storing information relating to the first category associated with sequential flow ahead of buffers storing information relating to the second category associated with change of flow when allocating a buffer for the storage of the fetched information to be buffered.

2. The signal processing system of claim 1 wherein the buffer control logic is arranged to prioritise buffers for the storage of information to be buffered if neither of a vacant buffer nor a buffer storing unused information is available.

3. The signal processing system of claim 1 wherein the buffer control logic is further arranged to maintain a minimum number of most recently allocated sequential flow information buffers.

4. The signal processing system of claim 3 wherein the buffer control logic is further arranged to track branch spans for change of flow fetches, and to adjust the minimum number value for the most recently allocated sequential flow information buffers in accordance with the tracked branch spans.

5. The signal processing system of claim 3 wherein the minimum number value for the most recently allocated sequential flow information buffers is configurable by software executed on a master device of the signal processing system.

6. The signal processing system of claim 1 wherein, upon receipt of fetched information relating to a change of flow, the buffer control logic is arranged to categorise information to be buffered according to a change of flow span for the information to be buffered.

7. The signal processing system of claim 6 wherein the buffer control logic is arranged to determine a change of flow span for the information to be buffered, and if the determined change of flow span is less than a threshold span length to categorise the information as sequential flow information.

8. The signal processing system of claim 1 wherein the buffer control logic is arranged, upon determining an appropriate category of stored information to be replaced, to allocate a buffer storing the least recently used information of the appropriate category.

9. An integrated circuit comprising the signal processing system of claim 1.

10. The signal processing system of claim 2 wherein the buffer control logic is further arranged to maintain a minimum number of most recently allocated sequential flow information buffers.

11. The signal processing system of claim 2 wherein, upon receipt of fetched information relating to a change of flow, the buffer control logic is arranged to categorise information to be buffered according to a change of flow span for the information to be buffered.

12. The signal processing system of claim 3 wherein, upon receipt of fetched information relating to a change of flow, the buffer control logic is arranged to categorise information to be buffered according to a change of flow span for the information to be buffered.

13. The signal processing system of claim 6 wherein the buffer control logic is arranged, upon determining an appropriate category of stored information to be replaced, to allocate a buffer storing the least recently used information of the appropriate category.

14. The signal processing system of claim 2 wherein the buffer control logic is arranged, upon determining an appropriate category of stored information to be replaced, to allocate a buffer storing the least recently used information of the appropriate category.

15. The signal processing system of claim 3 wherein the buffer control logic is arranged, upon determining an appropriate category of stored information to be replaced, to allocate a buffer storing the least recently used information of the appropriate category.

16. The signal processing system of claim 1 wherein the sequential flow is an information flow with memory access requests that relate to sequential addresses for information within the at least one memory element.

17. The signal processing system of claim 1 wherein the change of flow is a forward branch that includes accessed address jumps beyond a current buffer length.

18. A method for buffering information, the method comprising:
receiving information to be buffered;
categorising the information to be buffered according to at least one of a first category associated with sequential flow and a second category associated with change of flow; and
prioritising buffers storing information relating to the first category associated with sequential flow ahead of buffers storing information relating to the second category associated with change of flow when allocating a buffer for the storage of the fetched information to be buffered.

19. The method of claim 18 wherein the sequential flow is an information flow with memory access requests that relate to sequential addresses for information within the at least one memory element.

20. The method of claim 18 wherein the change of flow is a forward branch that includes accessed address jumps beyond a current buffer length.

* * * * *